United States Patent
Albrecht et al.

(10) Patent No.: US 11,595,348 B2
(45) Date of Patent: Feb. 28, 2023

(54) METHOD FOR CONFIGURING, METHOD FOR PROVIDING TOPOLOGY INFORMATION, NAME SERVICE SERVER, DEVICE, COMPUTER PROGRAM AND COMPUTER-READABLE MEDIUM

(71) Applicant: Siemens Aktiengesellschaft, Munich (DE)

(72) Inventors: Harald Albrecht, Nuremberg (DE); Stephan Höme, Schwabach (DE); Thomas Talanis, Heroldsbach (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 0 days.

(21) Appl. No.: 17/268,131

(22) PCT Filed: Jul. 30, 2019

(86) PCT No.: PCT/EP2019/070499
§ 371 (c)(1),
(2) Date: Feb. 12, 2021

(87) PCT Pub. No.: WO2020/035308
PCT Pub. Date: Feb. 20, 2020

(65) Prior Publication Data
US 2021/0328967 A1  Oct. 21, 2021

(30) Foreign Application Priority Data
Aug. 13, 2018  (EP) .................................... 18188735

(51) Int. Cl.
*H04L 61/3015* (2022.01)
*H04L 41/12* (2022.01)
(Continued)

(52) U.S. Cl.
CPC .......... *H04L 61/3025* (2013.01); *H04L 41/12* (2013.01); *H04L 61/3015* (2013.01);
(Continued)

(58) Field of Classification Search
CPC ......... H04L 41/12; H04L 45/02; H04L 61/30; H04L 61/3015; H04L 61/3025;
(Continued)

(56) References Cited

U.S. PATENT DOCUMENTS

| 10,069,789 B2 | 9/2018 | Albrecht et al. |
| 2004/0230446 A1* | 11/2004 | Park .................... H04L 61/3025 709/245 |

(Continued)

FOREIGN PATENT DOCUMENTS

| EP | 3076636 | 10/2016 | |
| EP | 3091714 | 11/2016 | |
| KR | 20180094644 A * | 8/2018 | ......... H04L 61/3025 |

OTHER PUBLICATIONS

Rentschler, Markus. "Faulty device replacement for industrial networks." IEEE 10th International Conference on Industrial Informatics. IEEE, 2012. (Year: 2012).*

(Continued)

*Primary Examiner* — Atta Khan
*Assistant Examiner* — William C McBeth
(74) *Attorney, Agent, or Firm* — Cozen O'Connor

(57) ABSTRACT

A method for providing topology information, use of a name service server, a device, a computer program, a computer-readable medium and a method for configuring a device to be named within an industrial network, wherein a) the device to be named receives a neighbouring name message from a neighbouring device, b) a self-naming module creates a topological neighbouring domain name based on the neighbouring name message, c) the self-naming module
(Continued)

transmits the topological neighbouring domain name to a name service server, d) the self-naming module receives from the name service server a response message, which includes at least one device name of the device to be named belonging to the topological neighbouring domain name, and e) at least one device name from the response message is assigned to the device to be named and this name is stored as the device name by the self-naming module.

14 Claims, 4 Drawing Sheets

(51) Int. Cl.
    *H04L 61/4511*     (2022.01)
    *H04L 61/5014*     (2022.01)
    *H04L 101/30*     (2022.01)
    *H04L 101/355*     (2022.01)

(52) U.S. Cl.
    CPC ...... *H04L 61/4511* (2022.05); *H04L 61/5014* (2022.05); *H04L 2101/30* (2022.05); *H04L 2101/355* (2022.05)

(58) Field of Classification Search
    CPC . H04L 67/12; H04L 2101/30; H04L 2101/35; H04L 2101/355; H04L 41/0803; H04L 41/0806; H04L 41/0813; H04L 61/4511
    See application file for complete search history.

(56) References Cited

U.S. PATENT DOCUMENTS

| | | | | |
|---|---|---|---|---|
| 2012/0041571 | A1* | 2/2012 | Biehler | H04L 41/0806 700/19 |
| 2012/0195231 | A1* | 8/2012 | Fonseca | H04L 41/12 370/255 |
| 2014/0156820 | A1* | 6/2014 | Moineau | H04L 41/0813 709/223 |
| 2015/0085828 | A1* | 3/2015 | Chen | H04L 61/4511 370/331 |
| 2015/0312096 | A1* | 10/2015 | Albrecht | H04L 41/0803 709/220 |
| 2015/0312213 | A1* | 10/2015 | Albrecht | H04L 61/3025 709/245 |
| 2016/0036638 | A1* | 2/2016 | Campbell | H04L 41/0806 709/222 |
| 2016/0241511 | A1* | 8/2016 | Albrecht | H04L 61/4511 |
| 2016/0330168 | A1* | 11/2016 | Albrecht | H04L 61/3025 |
| 2016/0380968 | A1* | 12/2016 | Sarwar | H04L 61/3025 709/245 |
| 2018/0083917 | A1* | 3/2018 | Xu | H04L 61/5014 |
| 2018/0309712 | A1* | 10/2018 | Jeong | H04L 61/3025 |

OTHER PUBLICATIONS

Cheshire et al., "DNS-Based Service Discovery", Internet Engineering Task Force RFC 6763, Feb. 2013 (Year: 2013).*

Gulbrandsen et al., "A DNS RR for specifying the location of services (DNS SRV)", Internet Engineering Task Force RFC 2782, Feb. 2000 (Year: 2000).*

"PROFINET System Description", PROFIBUS & PROFINET International (PI), Version Oct. 2014 (Year: 2014).*

"SIMATEC PROFINET PROFINET with SETP 7 V14 Functional Manual", Siemens, 2016, pp. 193-197 (Year: 2016).*

Lee, Sejun, Jaehoon Jeong, and Jungsoo Park. "DNS name autoconfiguration for IoT home devices." 2015 IEEE 29th International Conference on Advanced Information Networking and Applications Workshops. IEEE, 2015. (Year: 2015).*

Lee, Sejun, Jaehoon Paul Jeong, and Jung-Soo Park. "DNSNA: DNS name autoconfiguration for Internet of Things devices." 2016 18th International Conference on Advanced Communication Technology (ICACT). IEEE, 2016. (Year: 2016).*

Internet Engineering Task Force (IETF), Request for Comments: 7719, 27 pages, Jan. 12, 2015.

PCT International Search Report dated Sep. 17, 2019 based on PCT/EP2019/070499 filed Jul. 30, 2019.

* cited by examiner

METHOD FOR CONFIGURING, METHOD FOR PROVIDING TOPOLOGY INFORMATION, NAME SERVICE SERVER, DEVICE, COMPUTER PROGRAM AND COMPUTER-READABLE MEDIUM

CROSS-REFERENCE TO RELATED APPLICATIONS

This is a U.S. national stage of application No. PCT/EP2019/070499 filed 30 Jul. 2019. Priority is claimed on European Application No. 18188735.7 filed 13 Aug. 2018, the content of which is incorporated herein by reference in its entirety.

BACKGROUND OF THE INVENTION

1. Field of the Invention

The invention relates to a method for providing topology information, a name service server, a device, a computer program, a computer-readable medium and to a method for configuring a device to be assigned a name with an industrial network, preferably in an industrial automation system.

2. Description of the Related Art

In the field of networks, in particular industrial networks, the names of the network nodes increasingly play a key role in the identification of devices and the identification of functions, and the like. The Industrial Ethernet standard for automation (PROFINET) originated by the applicant, has used such names from the outset for the main identification of IO devices, in particular, rather than IP addresses.

Especially in the case where a device representing a network node is replaced, when names are used instead of IP addresses for identification, it is particularly important that the still empty replacement device receives its correct, unique name as quickly as possible. This process is also referred to as "name assignment", particularly in the context of PROFINET. In event of a device replacement, a rapid "name reassignment" is therefore desirable or necessary.

One way to assign names to devices is to use a "topological" name assignment, the principle of which is based on that of network cabling between devices.

The applicant is aware that a (quasi-)centralized form of topological name assignment has been implemented in PROFINET. During the planning of an automation application with an engineering tool, the network interconnection of the automation devices is also recorded. The planning tool computes a list of "alias names" from this interconnection of the devices in conjunction with the device names. A particular device has as many alias names as it has Ethernet ports, but no more. An alias name consists of a port name, to which the device name of its neighboring device is appended. For example, for a port with the port name "port001" and a device name "io-2.hall1.acme.com", "port001" plus "io-2.hall1.acme.com" would be the resulting alias name for the device "io-3.hall1.acme.com" connected to the port "port001".

Once the individual devices have been incorporated into a network, they learn the names of their neighboring devices via the Link Layer Discovery Protocol (LLDP), which is defined in particular in Institute of Electrical and Electronics Engineers (IEEE) standard 802.1AB. According to the above rule, "Port name plus name of the neighboring device", any device that is not yet named can then compute its alias names. The individual devices do not know the alias name list. This is only known to the central planning tool that computed the alias name list.

The planning tool must load the alias name list into a PROFINET IO controller (IOC). Based on the loaded list, the IO controller then constantly attempts to discover devices that are still unnamed from their alias names. If one or more as yet unnamed devices are found using the alias names, then they are assigned the name that was previously assigned to the respective alias name in the planning tool. In addition, in the context of IPv4, various IPv4 parameters are often also assigned, such as IPv4 address, netmask, default gateway, and so on.

The topological name assignment provided for in PROFINET always requires a (quasi-)central IO controller, which performs the discovery of unnamed devices and then names them.

In the general IT field, particularly in the office environment, the Dynamic Host Configuration Protocol (DHCP) is often used (see Request for Comments (RFC) 2131 "Dynamic Host Configuration Protocol" and RFC 3315 "Dynamic Host Configuration Protocol for IPv6 (DHCPv6)" of the Internet Engineering Task Force (IETF)). This also allows a "host name" (device name) to be assigned to a device.

However, it is sometimes considered to be a disadvantage that DHCP uses the hardware network address (MAC) of a device as a unique key. If a device is replaced, then the MAC address also changes, so that automatic name assignment would cause large administrative effort. For this reason, to the best of the applicant's knowledge, DHCP is usually used with devices that have already received a unique name when the system was generated.

SUMMARY OF THE INVENTION

It is an object of the present invention to provide standalone assignment of device names to network devices in a manner that is both reliable and that can be performed with little effort.

This and other objects and advantages are achieved in accordance with the invention by a method for configuring a device to be assigned a name, in particular in an industrial network, preferably in an industrial automation system, in which a) the device to be named receives a neighbor name message from a neighboring device, where the message comprises at least a device name of the neighboring device, and optionally a name of the port of the neighboring device via which the neighbor name message is or was sent to the device to be named, b) based on the neighbor name message, a self-naming module of the device to be named creates a topological neighboring domain name, which comprises at least the received neighboring device name and the optionally received neighboring port name and/or the name of the port of the device to be named, via which port the device to be named received the neighbor name message, and comprises a specified additional name part known in particular to the self-naming module, c) the self-naming module transmits the topological neighboring domain name to a name service server, in particular a DNS server, preferably in the context of a DNS query, d) the self-naming module receives from the name service server, in particular in the context of a further DNS query, a response message that comprises at least one device name of the device to be named belonging to the topological neighboring domain name, and e) at least one device name from the response message is assigned to the device to be named, and this name is in particular stored by the self-naming module on the device to be named as the device name.

In addition, it is also an object of the invention to provide a device, in particular an automation device, which is configured to perform the method in accordance with the invention.

It is preferred that the device has at least one port, via which the device is or can be connected to a port of a further device representing a neighboring device, and the device has a self-naming module which is configured to a) based on a neighbor name message sent from a neighboring device to the device, where the message comprises at least one device name of the neighboring device and optionally a name of the port of the neighboring device via which the neighbor name message is or was sent to the device, create a topological neighboring domain name, which contains at least the received neighboring device name and the optionally received neighboring port name and/or the name of the port of the device, via which the device received the neighbor name message, and a specified additional name part known in particular to the self-naming module, b) transmit the topological neighboring domain name to a name service server, in particular a DNS server, preferably in the context of a DNS query, (c) obtain from the name service, in particular in the context of a further DNS query, a response message that comprises at least one device name of the device belonging to the topological neighboring domain name, and (d) assign at least one device name from the response message to the device, in particular to store it on the device as the device name.

The present invention thus uses a server for a name service, in particular a domain name system (DNS) server, for providing topology information for a decentralized, automatic topological device name assignment.

Name assignment here is understood to particularly mean the assignment of a device name, in particular a host name, to a device and/or the receipt of a device name, in particular a host name, from a device and/or the storage of a device name, in particular a host name, on a device.

A device to be named is preferably one for which a device name is (yet) to be assigned, in particular because it has not yet received a device name or a device name has not yet been set. A device to be named can be characterized by a name file stored on the device that is still empty, or a name string stored on the device that is still empty. A device is in a state without a name before it has been commissioned for the first time in a network, such as in the factory state.

A device name or host name that is assigned to a device and, in particular, stored on it by performing the method in accordance with the invention for assigning it a name, is preferably a (globally) unique name, in particular a fully qualified domain name, particularly preferably a fully qualified domain name in the sense of the RFC 7719 (Request for Comments: 7719 of the Internet Engineering Task Force Group (IETF).

If the neighborhood relationships, i.e., topology information, resulting from a specific network connection are notified to a name service server or domain name system or if this information is provided to a name service server or in a domain name system, an as yet unnamed device can access this information very easily, such as via a DNS query.

If access to the network topology information is possible, it is sufficient if a device that is not yet named learns, for example, as soon as it is connected to the network, from a single neighboring device that already knows its device name, the device name and the name of the port of the neighboring device via which the unnamed device is connected to the neighboring device. Knowing the neighboring device name and neighboring port name and the neighborhood relationships, the device's own name can then be easily determined by the device.

The invention is based on the centralized form of a topological name assignment already implemented within the framework of PROFINET, except that it is not a central PROFINET IO controller that is or must be accessed in order to obtain the required neighborhood information, but rather a name service server. A central controller can therefore be omitted.

A name service is understood to mean a service that assigns (numeric) IP addresses, such as IPv4 or IPv6 IP addresses, to the names, in particular domain names, of devices, computers, of services. The Domain Name System (DNS) is such a service, the main task of which is normally to respond to requests for name resolution, i.e., translation of names into addresses, in particular in IP-based networks. Standards related to the DNS are, in particular, the RFC 1034 and RFC 1035. A server that offers a name service is also referred to as a name service server (or nameserver), and in the case of DNS, also as a DNS server. The name service server from which topology information for a self-naming process is obtained according to the invention can be a local name service server. It does not matter "from where" the DNS server provides its service. It can be provided anywhere as long as there is IP accessibility (IP connectivity) to the DNS server(s) supplying the service. For example, "local" can be in the same subnet or even somewhere in a cloud, for example, of a company. This freedom or independence is an important characteristic of the DNS.

The approach in accordance with the invention also enables automatic self-naming of devices to be performed in environments that are independent of PROFINET. The solution is then a decentralized one. Each device is independently capable of assigning a name to itself as soon as IP or DNS connectivity is established via standard mechanisms. The implementation in this case is ad hoc. The topology information cannot only be acquired in advance in a planning tool as before, but can also be acquired using simple standard means, e.g., in a test setup, "frozen" and then imported into the name service, in particular a domain name system. Another advantage is the ability to use standard environments. The information is standardized and provided using established IT technologies, particularly in the framework of a DNS.

In a network in which at least one node has not yet been named, in particular, each device is connected to one or more other devices, where in particular point-to-point links are used. Preferably, a device to be named comprises one or more ports, where each port is connected to a port of another device subscribing to the network, preferably via a cable. For example, a plurality of devices are wired using Ethernet cables, with each device having two ports. In a neighborhood relationship file, the device names of all nodes, in particular in the form of fully qualified domain names, are stored together with topological information in the form of the respective neighborhood relationships.

If one assumes (for solely illustrative purposes) that, for example, multiple devices of a network are wired in a "geometrically horizontal" line, where each device has a "geometrically left" port and a "geometrically right" port, then each device can be connected, for example, to the left-hand neighbor in the line via a "left" port and to the right-hand neighbor via a "right" port, in particular via a cable. In the at least one neighborhood relationship file, the information would then be stored that the right-hand port P1 of a device G1 with the fully qualified domain name FQDN1 is connected to the right-hand neighboring device G2, where the fully qualified domain name FQDN2 of the right-hand neighbor G2 is stored in the neighborhood relationship file as belonging to the port P1 of device G1.

The network is in particular an IPv6 network (see e.g. RFC 2460).

If there are, for example, many "piece-wise" connections (links) in an IP subnet, via which a device is particularly connected to a neighboring device, these are also referred to as point-to-point links.

The self-naming module can be implemented purely in software or purely in hardware or by a combination of suitable hardware and software. The self-naming module can be a separate functional unit of the device. The self-naming module can run as software on hardware already present in the device to be named, for example, an already existing processor. However, it can also be hardware specifically designed for the self-naming module.

A fully qualified domain name (FQDN) is, in particular, one as defined in RFC 7719.

The device name received from a neighbor in step a) can be, for example, a PROFINET device name, in particular a Name of Station (NoS). The device name received from a neighbor in step a) can be a fully qualified domain name (FQDN), in particular as defined by RFC 7719. It can also be a partially qualified domain name (PQDN), in particular as defined in RFC 7719.

The device name(s) received with the response message is/are preferably fully qualified domain names (FQDN).

The topological neighboring domain name that is created comprises, in particular, the received neighboring device name and either the optionally received name of the port of the neighboring device via which the neighbor name message is or has been sent to the device to be named, or the name of the port of the device to be named via which the device to be named received the neighbor name message. Of the two ports, via each of which two neighbors are connected, one is sufficient to determine the neighborhood relationship. The topological neighboring domain name particularly and preferably comprises the neighboring device name and the name of the port of the neighboring device via which the neighbor name message is or has been sent to the device to be named.

Even if it is not necessary to know or specify both ports, there is no reason why, however, both the send port of the neighbor and the receive port of the device to be named cannot be included in the topological neighboring domain name.

A device to be assigned a name, or a device in accordance with the invention, can be present in the form of an automation device, for example. For example, it can be an IO device of an automation system.

If in step d) the device to be named receives a response message with multiple device names belonging to the topological neighboring domain name, then these are preferably sorted alphabetically and the device name at the top of the list is preferably assigned to the device to be named as the device name.

In a preferred embodiment of the method in accordance with the invention, during step a) a neighbor name message is received with a neighboring device name, which is given by a partially qualified domain name (PQDN) or a fully qualified domain name (FQDN). Here, the self-naming module checks in particular whether the neighboring device name is a fully qualified domain name and, if so, in step b) includes it in the topological neighboring domain name unchanged as the neighboring device name. If the neighboring device name is a partially qualified domain name, then the self-naming module creates a fully qualified domain name from it by adding a suffix, in particular a DNS suffix, and in step b) includes this name in the topological neighboring domain name as the neighboring device name.

It is possible that a neighbor name message is received from a neighboring device that comprises a neighboring device name that is only locally unique, in particular only in the subnet in which the neighboring device is located. Here, the neighboring device name particularly represents an (only) partially qualified domain name (PQDN). Here, the self-naming module first generates a neighboring device name that is (globally) unique. This can be performed in a known way by adding at least one suffix to the partially qualified domain name.

The suffix to be added to obtain a (globally) unique neighboring device name advantageously represents an additional component of the name to be attached.

In a further embodiment of the method in accordance with the invention, during step a) a neighbor name message is received containing a neighboring device name given by a partially qualified domain name (PQDN), and a suffix which the device has received via a Router Advertisement Message, preferably a Router Advertisement Message according to IPv6, is appended to the partially qualified domain name. Preferably, the at least one Router Advertisement Message is one as defined in RFC 4861.

The device to be named may have obtained the suffix, for example, by performing the method described in EP 3 091 714 A1, also due to the applicant. The suffix to be appended is then in particular a component designated in EP 3 091 714 A1 as a hierarchical name context or topological and/or hierarchical name component.

A suffix can in particular also be used as a migration path for an existing PROFINET infrastructure with only locally unique names.

In a further preferred embodiment of the method in accordance with the invention, during step b) the topological neighboring domain name is created according to the pattern: port name, followed by a period, followed by the specified additional name part, followed by a period, followed by the neighboring device name. In particular, as an additional benefit, this formulation allows the assignment of multiple names to the same device. Here, in particular multiple pointer (PTR) resource records (RR) exist for the same domain name, which can be a DNS owner name or DNS domain name. An owner name means, in particular, a domain name that satisfies the additional condition that is on the "left" side of an RR definition, such as in a zone file. Domain names can also appear elsewhere (such as on the "right" side), as in the PTR RRS, SOAs, or CNAMEs.

For example, for a neighboring port name "port0001" and, for example, a specified additional name part "_topo" and, for example, a neighboring device name "io-1.zelle1.elc.", according to the above-mentioned pattern this would result in a topological neighboring domain name "port0001._topo.io-1.zelle1.elc.".

It may be provided that the specified additional name component (as in the preceding example) in particular has an underscore at its beginning. The underscore then preferably follows the special pattern introduced in RFC 6763 to prevent clashes with conventional hostnames in child domains.

In another preferred embodiment of the method in accordance with the invention, during step a) the device to be named receives a neighbor name message from the neighboring device according to the Link Layer Discovery Protocol (LLDP) defined in IEEE 802.1AB.

It has been shown that the proven Link Layer Discovery Protocol can be used to obtain information about the name and port of at least one neighbor.

The neighboring device is, in particular, a neighboring device or a neighbor in the sense of the LLDP protocol and/or IEEE 802.1AB.

In particular, a so-called Port Description TVL of type 4 can be transmitted between neighbors over LLDP. The content (value) of a port description TVL then preferably follows a specified form "<port>.<nos>", where the field <port> corresponds to the port name, and can have the form "port001", "port002" etc. The <nos> field corresponds to a hostname and can comprise one or more labels, up to the fully qualified domain name (FQDN).

If a neighbor name message is received that includes a neighboring device name that is only locally unique, in particular only in the subnet in which the neighboring device is located, then an extension to the hierarchical context must be made which, as described above, is possible by adding a suffix.

In a further embodiment, during step e) the device name is extracted from the response message by the self-naming module.

The response message received in step d) can also contain at least one pointer (PTR) resource record (RR), or can be given by one. The pointer or pointer record is in particular one according to RFC as defined in RFC 1035.

It is a further object of the invention to provide a method for providing topology information for the self-naming of devices, in particular in an industrial network, preferably an automation system, in which at least one neighborhood relationship file, in particular in the form of a preferably standardized zone file, is provided on a name service server, in particular a Domain Name System (DNS) server, where the at least one neighborhood relationship file comprises a list of neighborhood relationship entries for devices of the network, each neighborhood relationship entry comprising in particular a fully qualified domain name of the respective device and at least one associated topological neighboring domain name, which has in particular a fully qualified domain name of a neighboring device adjacent to the respective device as a neighboring device name, and the name of the port of the neighboring device to which the respective device is connected and/or the name of the port of the respective device via which it is connected to the neighboring device as the neighboring port name, and in particular at least one specified additional name component.

In an embodiment of the method in accordance with the invention, in order to provide topological information each neighborhood relationship entry can be given by or comprise a pointer (PTR) resource record (RR), where each pointer resource record preferably points from a topological neighboring domain name to a fully qualified domain name of a device.

It can additionally be provided that the topological neighboring domain name in each neighborhood relationship entry is created in accordance with the pattern: port name followed by a period, followed by the specified additional name part, followed by a period, followed by the neighboring device name.

There are different ways to provide or transmit the topology information to a name service or a name service server, i.e., to perform a (topology) registration.

Thus, in a further embodiment of the method in accordance with the invention, at least one neighborhood relationship file is provided by a central engineering tool that was used to set up the network in which the devices belonging to the neighborhood relationship entries are subscribed, and then transferred to the name service server.

Topology information is preferably exported from the engineering tool in the form of a "zone file", in particular a standardized zone file, and then imported into a name service server, in particular DNS server.

For example, a direct transfer of DNS data can be carried out using the DNS UPDATE operation, in particular as defined in the RFC 2136 "Dynamic Updates in the Domain Name System (DNS UPDATE)". Here, the primary DNS server responsible is automatically determined based on the FQDN(s) of the device. The first step is to determine the zone, where QUERY FQDN IN SOA returns the responsible SOA and thus the zone in which the FQDN resides.

The primary DNS server is then determined from the SOA RR "MNAME" (see RFC 1035, "DOMAIN NAMES—IMPLEMENTATION AND SPECIFICATION" and RFC 2181, "Clarifications to the DNS Specification"). The DNS information is then updated via DNS UPDATE to the previously specified zone.

If required, obsolete information may be deleted at the time of this transfer.

Alternatively or additionally, at least one neighborhood relationship file can also be provided by a central online tool that is used to perform a topology discovery of a given network, and the neighborhood relationship file is created based on the result of the topology discovery and then transferred to the name service server.

A topology discovery of the neighborhood structure can then be performed, in particular in response to a user command and/or in a time-controlled manner. This is possible, for example, using engineering and/or planning tools. Based on this neighborhood, the required DNS information that comprises, for example, pointer resource records (PTR RRs) or can be given by such, is then preferably computed. This data can then be transmitted online to the name service server and into the DNS, in particular by the above-described DNS UPDATE operation as defined in RFC 2136 and/or by zone file as defined in RFC 1035.

For example, a (stand-alone) online tool can be provided by a router together with a (local) DNS service.

An online tool for topology discovery can also be deployed in a cloud.

The (stand-alone) online tool can be executed, e.g., as a web server application or as a WEB-API with the corresponding smartphone app.

As another alternative or in addition, at least one neighborhood relationship file is created based on neighborhood information transmitted to the name service server by those devices of a network that have received their device names not by outperforming the configuration method in accordance with disclosed embodiments of the invention, but from an external source, in particular via DCP or DHCP or from a local name assignment mechanism.

An automatic self-registration of the devices can then occur, where the automatic self-registration is clearly separated from the self-naming process. This can ensure that incorrect interconnections do not cause the topology information in the name service, in particular DNS, to be updated incorrectly.

The topology information is self-registered only if the source of the information is an external source or assignment. However, the specific source is not registered in the name service along with it.

It is thus still possible to re-learn the topology by deliberately resetting the device "hostname" and then setting it afresh. This approach is more practical for small changes. In the case of major changes, the two other above-mentioned embodiments are likely to be preferable.

If self-registration is to be performed automatically, then, for example, the devices of a network each comprise a name service client, which in particular regularly sends updates to the name service server, in particular DNS updates, via which entries in the neighborhood relationship file stored on the name service server are updated. If the neighborhood relationship file comprises pointer (PTR) resource records (RR) describing the topology of the network, then it is specifically provided that these are preferably updated regularly via updates sent by name service clients of the devices. In particular, at least the information content is sent according to the standardized RFC 1034/1035 format. Updates sent may include the PTRs in particular.

There are different ways of representing resource records internally in a DNS, for example, they can be stored as memory pointers or database entries or JSONS.

In EP 3 091 714 A1, originated by the applicant, devices are described comprising name service clients that send DNS updates to a DNS server, via which address entries stored on the DNS server (for example, AAAA and possibly A RRs, where AAAA is an IPv6 address and A is an IPv4 address) for, in particular, fully qualified domain names of the devices are kept up to date.

It may be provided that the devices of a network each comprise a name service client via which address entries for, in particular, fully qualified domain names of the devices, as described in EP 3 091 714 A1, for example, and pointer (PTR) resource records (RR) describing the network topology are maintained jointly. It is also possible that the devices each have separate name service clients, which are autonomously responsible for the address entries (as described in EP 3 091 714 A1, for example) or PTR RRs they maintain.

As part of the method in accordance with disclosed embodiments of the invention for configuring a device to be assigned a name, during step d) the device to be assigned a name preferably receives a response from a name service server on which at least one neighborhood relationship file is or has been provided by performing the method in accordance with the above-described embodiments of the invention for providing topology information.

It is also an object of the present invention to provide a name service server including a processor and memory, in particular a DNS server, for providing topology information for the autonomous naming of devices, in particular in an industrial network, preferably an industrial automation system.

It is further object of the invention to provide a computer program comprising computer program code means for implementing the steps of the method in accordance with the disclosed embodiments of the invention for configuring a device to be assigned a name, or of the method in accordance with the disclosed embodiments of the invention for providing topology information.

Finally, it is also an object of the invention to provide a computer-readable medium comprising program instructions which, when executed on a processor of at least one computer, cause the at least one computer to perform the steps of the method in accordance with the disclosed embodiments of the invention for configuring a device to be assigned a name or of the method in accordance with the disclosed embodiments of the invention for providing topology information.

The computer-readable medium can be a CD-ROM or DVD, or a USB or flash memory, for example. It should be noted that a computer-readable medium should not be understood exclusively to mean a physical medium, but such a medium may also be present, for example, in the form of a data stream and/or a signal that represents a data stream.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

Further features and advantages of the present invention will become clear from the following description of embodiments in accordance with the invention, with reference to the attached drawing, in which.

DETAILED DESCRIPTION OF THE EXEMPLARY EMBODIMENTS

Figure 1:
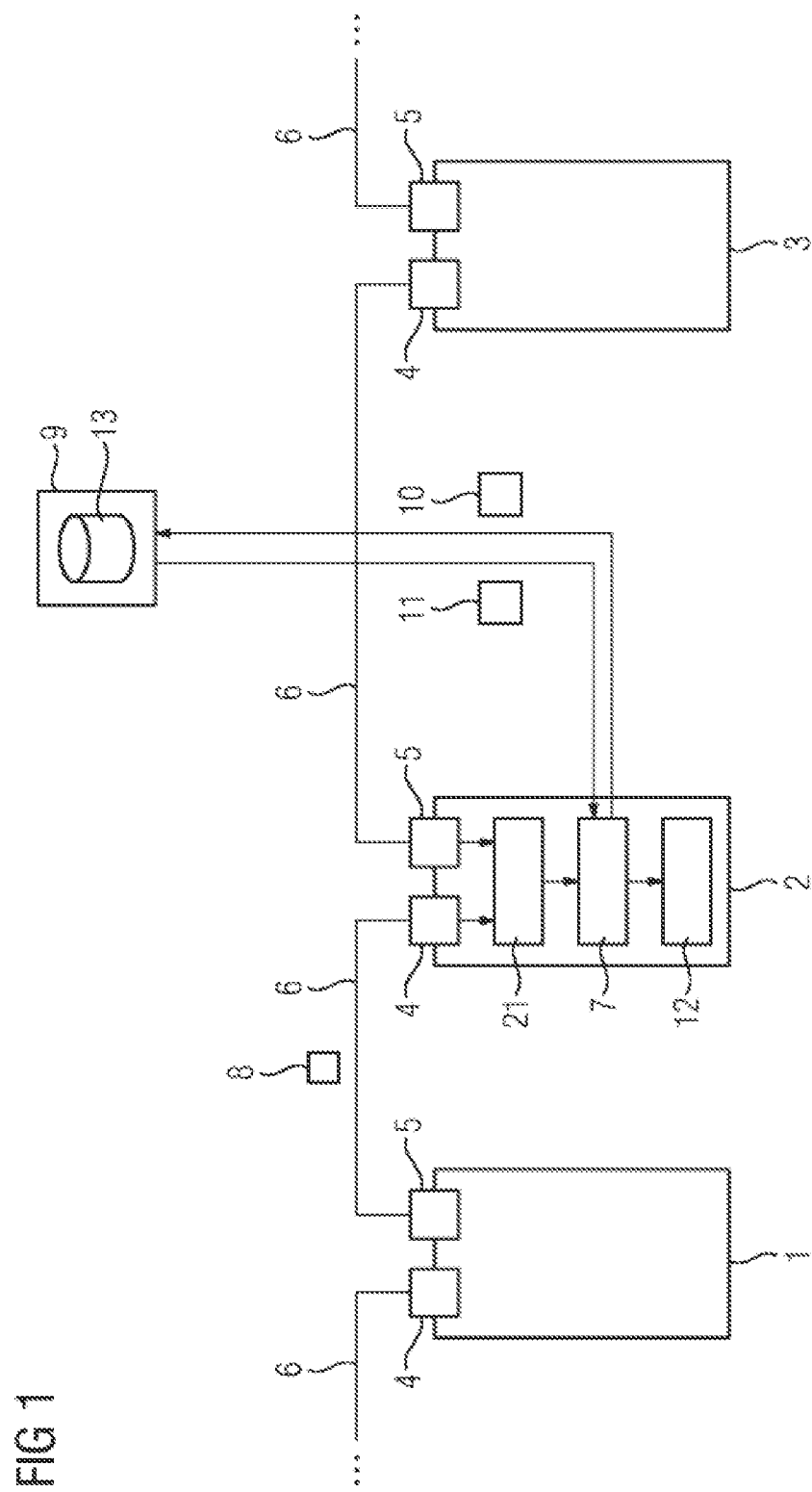
FIG. 1 shows a purely schematic representation of three devices of an industrial network of an automation system in accordance with the invention.

FIG. 1 shows a purely schematic partial representation of an industrial network, specifically of an automation system not shown in the figures. In the partial representation of FIG. 1, only three devices 1, 2, 3 of the plurality of network nodes are shown as examples, which in the context of the presently described exemplary embodiment are shown in the form of IO devices. The three devices 1, 2, 3 represent exemplary embodiments of automation devices in accordance with the invention the invention.

Each of the three devices 1, 2, 3 has a port 4 on the left in FIG. 1 and a port 5 on the right in FIG. 1, and the devices 1, 2, 3 are connected to each other such that in each case the left port 4 of a device 1, 2, 3 is connected to the neighbor to the left, specifically to the right port 5 thereof, and the right port 5 of each device 1, 2, 3 is connected to the neighbor to the right, specifically the left port 4 thereof, via a cable 6. The three small dots at the left and right ends of FIG. 1 indicate that only a section of the network is shown and other devices follow. In FIG. 1, this results accordingly in a cabling configuration in a "geometrically horizontal" line.

Here, the network uses the Industrial Ethernet standard PROFINET. PROFINET uses names—and not (numeric) IP addresses—for the main identification of IO devices 1, 2, 3.

Especially in the case where a device 1, 2, 3 representing a network node is replaced, such as due to a defect, when names are used instead of IP addresses for identification, it is important that a still empty replacement device receives its unique name quickly and with little effort. The process of obtaining a name in the context of PROFINET is also referred to as "name assignment".

The present invention offers a reliable way, in particular, of automatically assigning names, in particular to replacement devices, quickly and reliably and with little effort.

For this purpose, each of the three devices 1, 2, 3 comprises a self-naming module 7. It should be noted that in FIG. 1, by way of example, the self-naming module 7 is shown only for the middle device 2. In principle, all devices in a network may have a self-naming module 7 or only some of the devices, such as only devices for which regular replacement is to be expected.

The following text only discusses (also by way of example) the self-naming of the middle device 2. It should be emphasized that the same processes can also be used for self-naming the devices 1 and 3 and other devices of the network.

The self-naming module 7 is configured, based on a neighbor name message 8 sent from a neighboring device 1, 3 to the device 2, which message comprises a device name of the neighboring device 1, 3 and a name of the port 4, 5 of the neighboring device 1, 3 via which the neighbor name message 8 is or was sent to the device 2, to create a topological neighboring domain name (TNDN), where the TNDN contains the received neighboring device name, the received neighboring port name, and a specified additional name part known to the self-naming module 7.

The self-naming module 7 is further configured to transmit the topological neighbor domain name to a name service server 9 which, in this case, is a DNS server, within the context of a DNS query 10.

The self-naming module 7 is also configured to receive a response message 11 from the DNS server 9 with at least one device name in the form of a fully qualified domain name (FQDN) (as defined by RFC 7719) in the context of a further DNS query, and to assign a device name from the response message 11 to the device 2 and store it on the device 2 as the device name. A device name that has already been stored is represented in FIG. 1 purely schematically by a block element which is assigned the reference sign 12.

In order to enable the self-naming process by accessing the DNS server 9, topology information about this network is stored on the server. The information stored includes which devices are neighbors, in particular which devices are directly connected to each other.

The additional topology information available on the DNS server 9 is indicated in FIG. 1 by an element labeled with the reference sign 13 on the DNS server 9.

In the presently described exemplary embodiment, the specific information stored on the DNS server 9 is a neighborhood relationship file in the form of a standardized zone file as defined in RFC 1034 and RFC 1035, which comprises the topology information. The zone file includes a plurality of neighborhood relationship entries, each given by a pointer (PTR) resource record (RR). Each pointer resource record (PTR RR) maps from a topological neighbor domain name to a fully qualified domain name of a device.

Figure 3:
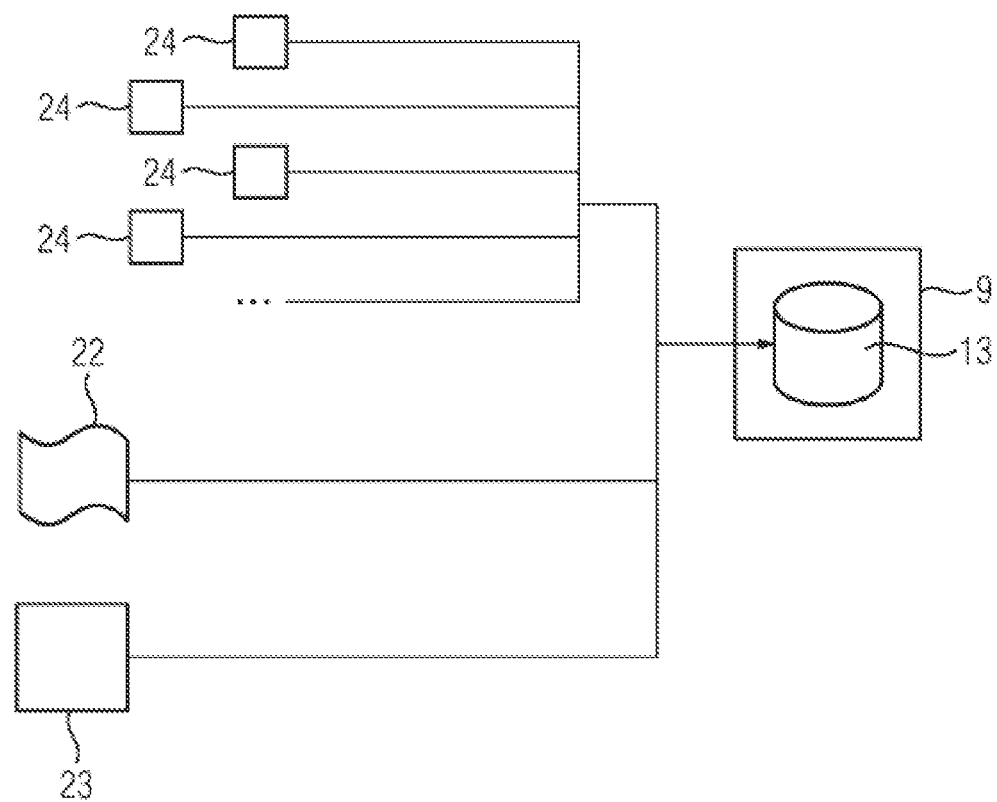
FIG. 3 shows a purely schematic representation for the transmission of information about neighborhood relationships to the name service server in accordance with the invention.

Assuming that the device 1 on the left in FIG. 1 is called "io-1", the middle device 2 to be assigned a name is to receive the name "io-2", and the device 3 on the right in FIG. 3 has the name "io-3", and in each case the left-hand port 4 has the name "port0001" and the right-hand port 5 has the name "port002", the structure of the associated zone file with the neighborhood relationships can be taken from the following representation extract:

port002._topo.io-1.zelle1.elc. IN PTR ioc-2.zelle1.elc.
port001._topo.io-2.zelle1.elc. IN PTR ioc-1.zelle1.elc.
port002._topo.io-2.zelle1.elc. IN PTR ioc-3.zelle1.elc.
port001._topo.io-3.zelle1.elc. IN PTR ioc-2.zelle1.elc.

Figure 2:
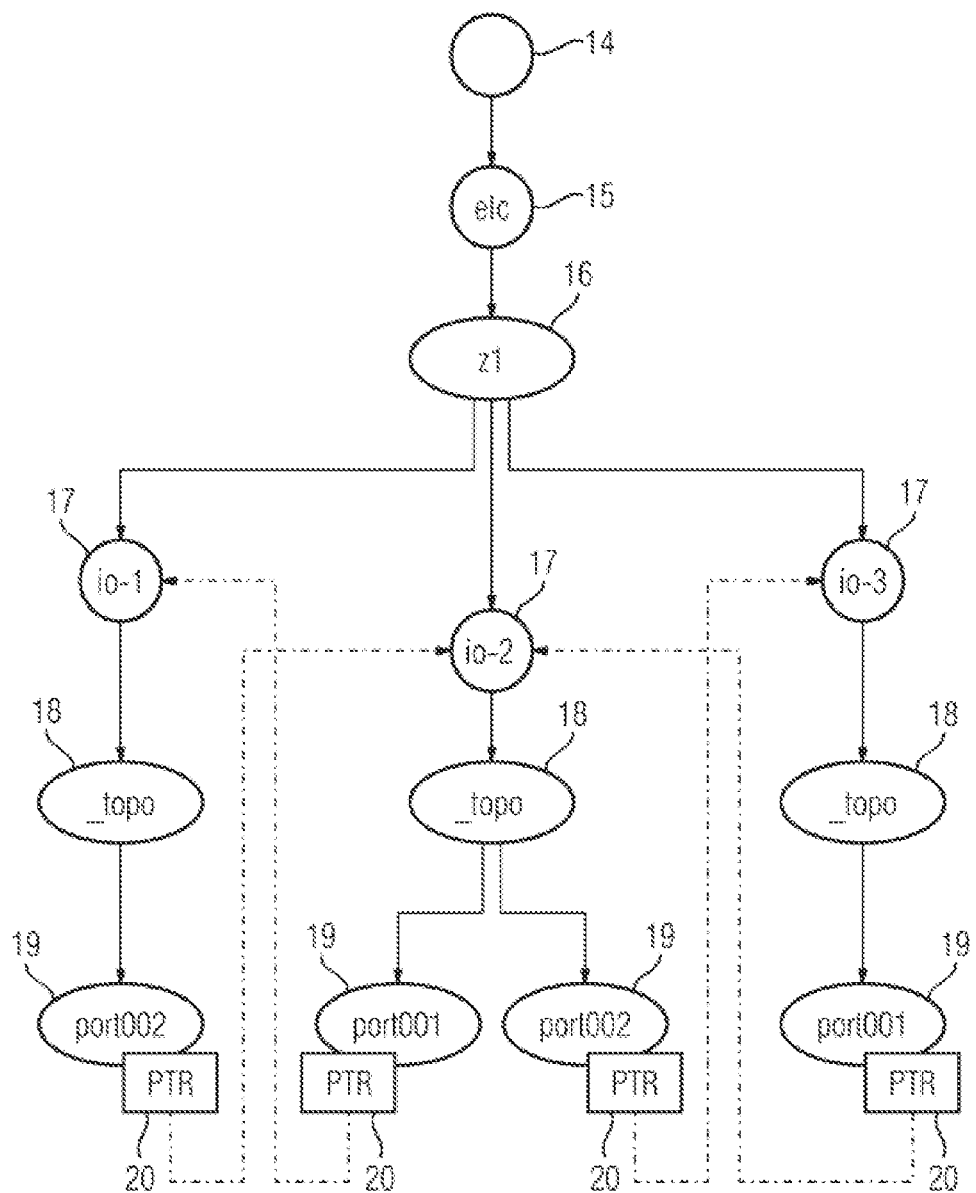
FIG. 2 shows a purely schematic representation of how the topology information is stored in the DNS name space in accordance with the invention.

For ease of illustration, FIG. 2 shows in a purely schematic form how the topology information required for the topological self-naming is stored in the DNS name space of the DNS server 9. The figure shows the root ".", labeled with the reference sign 14, the top-level domain "elc" labeled with reference sign 15, which is chosen here purely as an example with the abbreviation for "Effortless Communication" mentioned earlier, the second-level domain "zelle1" labeled with the reference sign 16, which is indicated in FIG. 2 only by the abbreviation "z1", and the device names io-1, io-2 and io-3, labeled with reference sign 17. The label "_topo", which is assigned the reference sign 18 in FIG. 2, belongs to the new (sub)namespace directly below the fully qualified domain names of the devices 1, 2, 3. The leading underscore in the label follows a special pattern as introduced by RFC6763 to prevent clashes with "normal" hostnames in child domains. This is followed by the port names "port0001" and "port002", labeled with reference sign 19, of the ports 4, 5 of devices 1, 2, 3, and the corresponding pointers "PTR" labeled with reference sign 20, each pointing to a neighboring device name in the form of an FQDN. In FIG. 2, dotted arrows indicate the neighbor to which the respective pointer 20 points.

How the topology information in the DNS was provided will be discussed in more detail below.

The self-naming of a device using this information in the DNS can be performed as follows.

After the device 2 has been connected to the network as a replacement device, the device 2 receives a neighbor name message 8 from the neighboring device 1, formatted according to the Link Layer Discovery Protocol (LLDP) defined in IEEE 802.1AB. In the exemplary embodiment shown here, the device 2 (as well as every other device) comprises an LLDP module 21, which receives the neighbor name message 8 and forwards it to the self-naming module 7. In FIG. 1, this is illustrated by corresponding arrows. The neighbor name message 8 is sent via the right-hand port 5 of the neighboring device 1 and received by the left-hand port 4 of the device 2 connected to it via the cable 6.

It should be noted that FIG. 1 shows only one neighbor name message 8 schematically as an example, which is sent from the left-hand neighbor device 1 to the device 2. It should be understood it is also possible, alternatively or in addition, for a (further) name message to be sent from the right-hand neighbor device 3. This would be sent via the left-hand port 4 of the neighboring device 3 and would arrive at the right-hand port 5 of device 2 and also be received by the LLDP module 21. A corresponding arrow for this operation is also drawn in FIG. 1, connecting the right-hand port to the LLDP module 21.

The neighbor device 1, 3 from which a neighbor name message 8 is sent to the device 2 is not relevant. The only requirement is that a neighbor device 1, 3, which sends the neighbor name message 8 knows its name, i.e., has already been assigned a name.

The neighbor name message 8 sent to the device 2 accordingly comprises the neighbor name "io-1.elc." and the port name "port0002" via which the message 8 was sent from the neighboring device 1 to the device 2. The neighbor name "io-1.elc." represents a PROFINET device name, specifically a name of station (NoS).

It is not always the case that neighbor names sent via neighbor name messages 8 from neighboring devices 1, 3 represent fully qualified domain names (FQDNs) that are (globally) unique, but it can also be the case that (locally) unique device names are only assigned in a subnet. As such, the self-naming module 7, after receiving a neighboring device name, first checks whether it is a fully or only partially qualified domain name (PQDN).

Whether a fully qualified domain name is present can be recognized, for example, from the fact that there is a period at the right-hand end of a received neighbor device name, as is the case here.

If such a check (in deviation from the example described here) reveals that it is not a fully qualified domain name but only a partially qualified domain name, then the self-naming module 7 first creates a fully qualified domain name, in which it appends a suffix, in particular a DNS suffix, to the received neighbor device name:

if isFQDN(NoS) then FQDN:=NoS else FQDN:=NoS+ "."+ELCSuffix.

In the example described here, the term ELCSuffix has been chosen, where ELC is an abbreviation standing for "Effortless Communication".

The DNS suffix may have been previously notified to the device 2, specifically its self-naming module 7, via a received Router Advertisement Message. The related procedures are described, for example, in EP 3 091 714 A1, which is also originated by the applicant. The suffix to be appended is then in particular the component designated in EP 3 091 714 A1 as a hierarchical name context or topological and/or hierarchical name component.

On the basis of the device FQDN (possibly obtained by appending a suffix) and the port name "port0002" of port 5, via which the neighbor name message 8 was sent from the neighboring device 1, the self-naming module 7 then creates a topological neighbor domain name (TNDN) according to the following pattern:

TND:=LocalPortName+"."+"_topo"+"."+FQDN.

After the topological neighbor domain name has been created in accordance with the above-mentioned pattern, the self-naming module 7 performs a DNS query 10 to determine a (if necessary, multiple) reference(s) to the fully qualified domain name of the device 2 to be assigned a name. In FIG. 1, the DNS query is indicated purely schematically by an arrow pointing from the self-naming module 7 to the DNS server 9 and a block element next to the arrow, labeled with the reference sign 10.

For example, the query can have the following form:
PTRRRSET:="QUERY" TNDN "IN" "PTR".

This is used to search for the pointer (PTR) resource records (RRs) in the "IN" name space of the DNS.

In response to the DNS query 10, the self-naming module 7 receives a resource record set (RRSet) from the DNS server 9 with pointer resource records (PTR RRs). From these, the self-naming module 7 extracts the domain names to which the pointers refer. In case multiple domain names are received, they can be sorted alphabetically, for example, and the first name can be used as the device name or host name for the autonomous name assignment of the device 2:

Hostname:=(sort (PTRRRSET)) [1].

The highest ranked name is then assigned to the device 2 as the unique device name and stored in the device. As already noted above, the stored unique device name, which was determined by means of the self-naming module 7, is indicated in FIG. 1 purely schematically by a block element labeled with the reference sign 12.

The device 2 is then "named" and can be reached.

Different methods are available to provide or transmit the topology information to the DNS server 9, i.e., to perform a (topology) registration.

In the present case, the topology information is provided in the form of the standardized zone file by performing an exemplary embodiment of the method in accordance with the invention for providing topology information for the autonomous name assignment of devices 1, 2, 3 in an industrial network.

The zone file, an extract of which was shown above, was transferred to the DNS server 9 as a neighborhood relationship file by an engineering tool that was used to set up the network to which devices 1, 2, 3 represented in FIG. 1 are subscribed.

The zone file is provided using the central engineering tool and then imported by the DNS server 9.

This is shown purely schematically in FIG. 3. In this figure, the zone file provided is labeled with the reference sign 22 and the import is indicated by an arrow pointing from this to the DNS server 9.

For example, a direct transfer of DNS data can also be performed using the DNS UPDATE operation, in particular as defined in RFC 2136 "Dynamic Updates in the Domain Name System (DNS UPDATE)". In this case the primary DNS server responsible is automatically determined based on the FQDN(s) of the devices. The first step is to determine the zone, wherein QUERY FQDN IN SOA returns the responsible SOA and thus the zone in which the FQDN resides.

The primary DNS server is then determined from the SOA RR "MNAME" (see RFC 1035, "DOMAIN NAMES—IMPLEMENTATION AND SPECIFICATION" and RFC 2181, "Clarifications to the DNS Specification"). The DNS information is then updated via DNS UPDATE to the previously specified zone. If required, obsolete information may be deleted at the time of this transfer.

Alternatively or in addition to using an engineering tool, a neighborhood relationship file can also be provided by a central online tool that performs a topology discovery of a given network, and the neighborhood relationship file is created based on the result of the topology discovery and then transferred to the name service server.

A topology discovery of the neighborhood structure can then be performed, in particular in response to a user command and/or in a time-controlled manner. This is possible, for example, using an engineering and/or planning tool. Based on this neighborhood, the required DNS information, for example, the PTR RRs, is then preferably computed. This data can then be transmitted online to the name service server 9 and into the DNS, in particular using the above-described DNS UPDATE operation as defined in RFC 2136.

FIG. 3 shows an online topology tool represented schematically as a block element with the reference sign 23, and an arrow pointing from this to the DNS server 9 indicates the DNS update.

For example, a (stand-alone) online tool can be provided by a router together with a (local) DNS service. The (stand-alone) online tool can be executed, e.g., as a web server application or as a WEB-API with a corresponding smartphone app. It can also be deployed in a cloud.

Finally, alternatively or additionally, a neighborhood relationship file can also be created based on neighborhood information that is transmitted to the DNS server 9 by the devices of a network that have not received their device names via a self-naming procedure described above but from an external source, for example, via DCP or DHCP, or from a local name assignment mechanism. In FIG. 3, several such devices are provided with the reference number 24, as an example.

An automatic self-registration of the devices 1, 2, 3 can then occur, where the automatic self-registration is clearly separated from the self-naming process. This can ensure that incorrect interconnections do not cause the topology information in the name service, in particular DNS, to be updated incorrectly.

The approach in accordance with disclosed embodiments of the invention enables automatic self-naming of devices 1, 2, 3 to be performed. The solution is then a decentralized one. Each device 1, 2, 3 is independently capable of assigning its name itself as soon as IP or DNS connectivity is established via standard mechanisms. The implementation in this case is ad hoc. The topology information cannot only be acquired in advance in a planning tool as before, but can also be acquired using simple standard means, e.g., in a test setup, "frozen" and then imported into the name service. Another advantage is the ability to use standard environments. The information is standardized and provided using established IT technologies, in this case in the context of a DNS.

Figure 4:
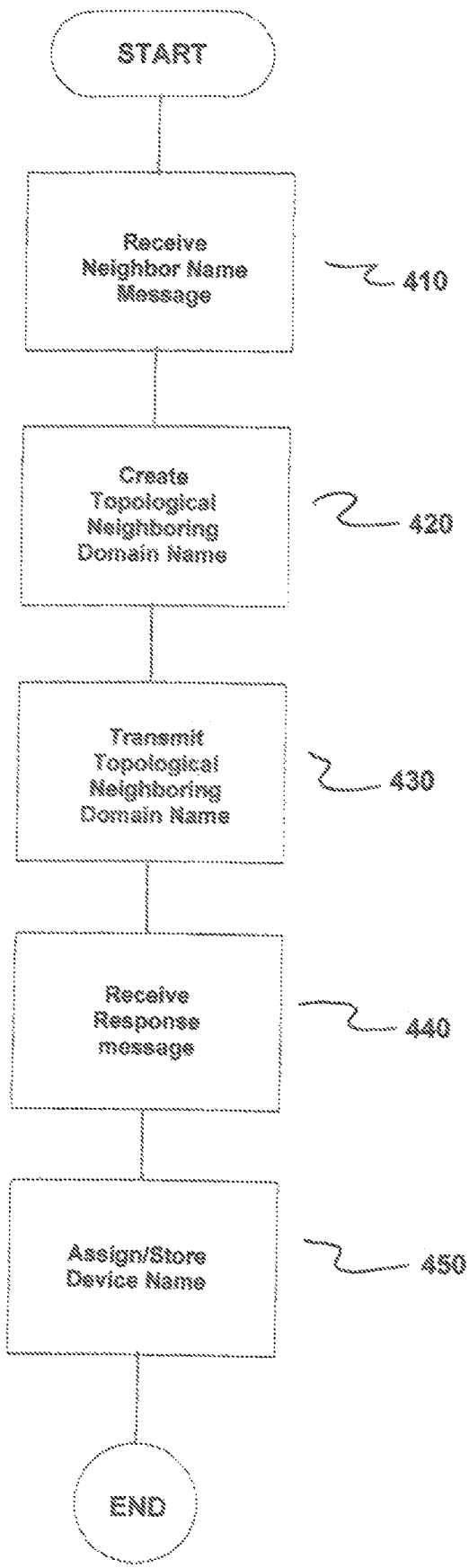

FIG. 4 is a flowchart of the method for configuring a device 2 to be assigned a name in an industrial network. The method comprises receiving, by the device 2 to be assigned the name, a neighbor name message 8 from a neighboring device 1, 3, as indicated in step 410. Here, the neighbor name message comprises at least a device name of the neighboring device 1, 3 and optionally the name of the port 4, 5 of the neighboring device 1, 3 via which the neighbor name message 8 is or was sent to the device 2 to be assigned the name.

Next, a self-naming module 7 of the device 2 to be assigned a name creates a topological neighboring domain name, based on the neighbor name message 8, as indicated in step 420. Here, the topological neighboring domain name comprises at least the received neighboring device name and the optionally received neighboring port name and/or the name of the port 4, 5 of the device 1, 2, 3 to be assigned a name, via which port the device 1, 2, 3 to be assigned the name received the neighbor name message 8, and a specified additional name part known to the self-naming module 7.

Next, the self-naming module 7 transmits the topological neighboring domain name to a name service server comprising a Domain Name System (DNS) server 9 in the context of a DNS query 10, as indicated in step 430.

Next, a response message 11 comprising at least one device name of the device 2 to be assigned a name belonging to the topological neighboring domain name is received by the self-naming module 7 from the name service server 9 in a context of a further DNS query, as indicated un step 440.

Next, at least one device name from the response message 11 is assigned to the device 2 to be assigned the name, and storing said assigned at least one device name is stored by the self-naming module 7 on the device 2 to be assigned a name as the device name, as indicated in step 450.

Although the invention has been illustrated and described in greater detail by means of the preferred exemplary embodiment, the invention is not restricted by the examples disclosed and other variations can be derived therefrom by the person skilled in the art without departing from the scope of protection of the invention.

Thus, while there have been shown, described and pointed out fundamental novel features of the invention as applied to a preferred embodiment thereof, it will be understood that various omissions and substitutions and changes in the form and details of the methods described and the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A method for configuring a device to be assigned a name in an industrial network, the method comprising:
  a) receiving, by the device to be assigned the name, a neighbor name message from a neighboring device, said neighbor name message comprising at least a device name of the neighboring device and optionally a name of a port of the neighboring device via which the neighbor name message is or was sent to the device to be assigned the name;
  b) creating, by a self-naming module of the device to be assigned a name, a topological neighboring domain name, based on the neighbor name message, said topological neighboring domain name comprising at least one of (i) at least the neighboring device name and the optionally received neighboring port name and (ii) the name of the port of the device to be assigned a name, via which port the device to be assigned the name received the neighbor name message, and a specified additional name part known to the self-naming module;
  c) transmitting, by the self-naming module, the topological neighboring domain name to a name service server comprising a Domain Name System (DNS) server in a context of a DNS query;
  d) receiving, by the self-naming module, from the name service server in a context of a further DNS query, a response message which comprises at least one device name of the device to be assigned a name belonging to the topological neighboring domain name; and
  e) assigning at least one device name from the response message to the device to be assigned the name, and storing said assigned at least one device name by the self-naming module on the device to be assigned a name as the device name;
  wherein during step (a) the neighbor name message is received containing the neighboring device name, which is given by a partially qualified domain name or a fully qualified domain name, the self-naming module checking whether the neighboring device name is a partially or fully qualified domain name and, when the neighboring device name is a fully qualified domain name, during step b) said fully qualified domain name being included unchanged in the topological neighboring domain name as the neighboring device name, and when the neighboring device name is a partially qualified domain name, the self-naming module creating a fully qualified domain name from said partially qualified domain name by adding a suffix comprising a DNS suffix, and during step b) said self-naming module including the fully qualified domain name created in the topological neighboring domain name as the neighboring device name.

2. The method as claimed in claim 1, wherein during step a) the neighbor name message is received containing the neighboring device name which is given by a partially qualified domain name, and a suffix which the device to be assigned a name has received via a Router Advertisement Message comprising a Router Advertisement Message according to IPv6 is appended to the partially qualified domain name.

3. The method as claimed in claim 1, wherein during step b) the topological neighboring domain name is created in accordance with the following pattern: port name, followed by a period, followed by a specified additional name part, followed by a period, followed by the neighboring device name.

4. The method as claimed in claim 3, wherein the specified additional name part comprises an underscore at a beginning of the specified additional name.

5. The method as claimed in claim 1, wherein during step a) the device to be assigned the name receives the neighbor name message from the neighboring device, in accordance with a Link Layer Discovery Protocol defined in Institute of Electrical and Electronics Engineers (IEEE) standard 802.1AB.

6. The method as claimed in claim 1, wherein during step e) the device name is extracted from the response message by the self-naming module.

7. The method as claimed in claim 1, wherein the response message received in step d) comprises or is given by at least one pointer resource record.

8. The method as claimed in claim 1, wherein the neighboring device name received in step a) is a PROFINET device name comprising a Name of Station.

9. The method as claimed in claim 1, wherein during step d) the device to be assigned the name receives the response message from the name service server, upon which at least one neighborhood relationship file is or has been provided.

10. The method of claim 1, wherein the industrial network comprises an industrial automation system.

11. A name service server comprising a Domain Name System Server for providing topology information for self-naming of devices in an industrial network comprising an industrial automation system, the name service server comprising:
a processor; and
memory;
wherein the name service server being configured to:
  receive, from a self-naming module of a device, a topological neighboring domain name in a context of a DNS query; and
  transmit, in a context of a further DNS query, a response message which comprises at least one device name of the device to be assigned a name belonging to the topological neighboring domain name; and
wherein the device including the self-naming module receives a neighbor name message containing a neighboring device name, which is given by a partially qualified domain name or a fully qualified domain name, the self-naming module checking whether the neighboring device name is a partially or fully qualified domain name and, (i) when the neighboring device name is a fully qualified domain name, said fully qualified domain name being included unchanged in the topological neighboring domain name as the neighboring device name, and (ii) when the neighboring device name is a partially qualified domain name, said self-naming module creates a fully qualified domain name from said partially qualified domain name by adding a suffix comprising a DNS suffix, and said self-naming module including the fully qualified domain name created in the topological neighboring domain name as the neighboring device name.

12. A device comprising an automation device, the device comprising:
a processor;
a self-naming module; and
memory;
wherein the device is configured to:
  a) receive a neighbor name message from a neighboring device, said neighbor name message comprising at least a device name of the neighboring device and optionally a name of a port of the neighboring device via which the neighbor name message is or was sent to the device;
  b) create a topological neighboring domain name, based on the neighbor name message, said topological neighboring domain name comprising at least one of (i) at least the neighboring device name and the optionally received neighboring port name and (ii) the name of the port, via which port the device received the neighbor name message, and a specified additional name part known to the self-naming module;
  c) transmit the topological neighboring domain name to a name service server comprising a Domain Name System (DNS) server in a context of a DNS query;
  d) receive from the name service server in a context of a further DNS query, a response message which comprises at least one device name belonging to the topological neighboring domain name; and
  e) assign at least one device name from the response message to the device, and store said assigned at least one device name on the device;
wherein during step (a) the neighbor name message is received containing the neighboring device name, which is given by a partially qualified domain name or a fully qualified domain name, the self-naming module checking whether the neighboring device name is a partially or fully qualified domain name and, when the neighboring device name is a fully qualified domain name, during step b) said fully qualified domain name being included unchanged in the topological neighboring domain name as the neighboring device name, and when the neighboring device name is a partially qualified domain name, the self-naming module creating a fully qualified domain name from said partially qualified domain name by adding a suffix comprising a DNS suffix, and during step b) said self-naming module including the fully qualified domain name created in the topological neighboring domain name as the neighboring device name.

13. The device as claimed in claim 12, wherein the device includes at least one port via which said device is or can be connected to a port of a further device representing the neighboring device; and
wherein the self-naming module is configured to perform the steps b-e.

14. A non-transitory computer-readable medium comprising instructions of computer program which, when executed by a processor on at least one computer, cause the at least one computer to configure a device to be assigned a name in an industrial network, the method comprising:
  a) program code for receiving, by the device to be assigned the name, a neighbor name message from a neighboring device, said neighbor name message comprising at least a device name of the neighboring device and optionally a name of a port of the neighboring device via which the neighbor name message is or was sent to the device to be assigned the name;
  b) program code for creating, by a self-naming module of the device to be assigned a name, a topological neighboring domain name, based on the neighbor name message, said topological neighboring domain name comprising at least one of (i) at least the neighboring device name and the optionally received neighboring port name and (ii) the name of the port of the device to be assigned a name, via which port the device to be assigned the name received the neighbor name message, and a specified additional name part known to the self-naming module;
  c) program code for transmitting, by the self-naming module, the topological neighboring domain name to a name service server comprising a Domain Name System (DNS) server in a context of a DNS query;
  d) program code for receiving, by the self-naming module, from the name service server in a context of a further DNS query, a response message which comprises at least one device name of the device to be assigned a name belonging to the topological neighboring domain name; and
  e) program code for assigning at least one device name from the response message to the device to be assigned the name, and storing said assigned at least one device name by the self-naming module on the device to be assigned a name as the device name;
  wherein during step (a) the neighbor name message is received containing the neighboring device name, which is given by a partially qualified domain name or a fully qualified domain name, the self-naming module checking whether the neighboring device name is a partially or fully qualified domain name and, when the neighboring device name is a fully qualified domain name, during step b) said fully qualified domain name being included unchanged in the topological neighboring domain name as the neighboring device name, and when the neighboring device name is a partially qualified domain name, the self-naming module creating a fully qualified domain name from said partially qualified domain name by adding a suffix comprising a DNS suffix, and during step b) said self-naming module including the fully qualified domain name created in the topological neighboring domain name as the neighboring device name.

* * * * *